UNITED STATES PATENT OFFICE

ROSCOE H. CARTER, OF WASHINGTON, DISTRICT OF COLUMBIA

PROCESS FOR THE MANUFACTURE OF INSECTICIDES AND METHOD OF MAKING SAME

No Drawing.   Application filed November 15, 1929. Serial No. 407,556.

(GRANTED UNDER THE ACT OF MARCH 3, 1883, AS AMENDED APRIL 30, 1928; 370 O. G. 757)

This application is made under the act of March 3, 1883, amended April 30, 1928, and the invention herein described may be manufactured and used by or for the Government for governmental purposes without payment to me of any royalty thereon.

I hereby dedicate the invention herein described to the free use of the public, to take effect upon the granting of a patent to me.

This invention relates to methods of making double fluorides and it comprises methods of making double fluorides and products thereof and being in the form of dried gels wherein water insoluble compounds of aluminum are treated with alkali metal compounds and hydrofluoric acid in the presence of water and in the proper molecular proportions and heated and the resultant gel is filtered, washed and dried by any suitable means.

As pointed out in other patent applications of mine, the double fluorides of the alkali metals are useful insecticidal materials and can be formed from water soluble salts of aluminum by treatment with alkali metal compounds and fluorine acids in the proper molecular proportions. There is also available commercially some water insoluble compounds of aluminum as the oxide $Al_2O_3$ or the hydrate, etc. Therefore I propose as a new and useful invention the process of treating an insoluble compound of aluminum with alkali metal compounds and hydrofluoric acid in the proper molecular proportions and heating the reaction mixture wherein is precipitated the insoluble double fluoride of the alkali metal with aluminum. As an illustration this equation is given:

$$Al_2O_3 + 6KOH + 12HF = 2K_3AlF_6 + 9H_2O.$$

The following example of an actual preparation is given: One hundred and fifty grams of aluminum oxide, $Al_2O_3$, was mixed in six liters of water with 495 g. of potassium hydroxide, KOH, and to this mixture was added 735 g. of hydrofluoric acid, HF, 48%, with stirring. Considerable heat was generated by the chemical reactions taking place and enough heat was added externally to bring the reacting mixture to the boiling point at which temperature it was maintained for 20–30 minutes. The reactions take place with the liberation of heat and additional heating was not necessary to complete them, but was desirable to speed them up and cause a more intimate mixture of the reactants. The double fluoride of potassium and aluminum, $K_3AlF_6$, being insoluble, was precipitated in a gelatinous form, filtered, washed several times with water, dried and powdered by grinding.

A small quantity of water is necessary in excess of that formed in the reaction for convenience of manipulation. It does not materially change the reaction when any two are mixed separately and the third added or when all three are mixed simultaneously. Probably the most convenient however is to mix the $Al_2O_3$ with the KOH in a small amount of water and then add aqueous hydrofluoric acid. Gaseous HF would give the same reaction. Considerable heat is generated by these reactions, causing them to proceed rapidly. Other insoluble aluminum compounds as $Al(OH)_3$, etc. may be used and other alkaline hydroxides, oxides, peroxides, carbonates, etc. may be substituted.

I claim:

1. The process of making insecticidal preparations containing water insoluble double fluorides of the alkali metals with aluminum which comprises treating a water insoluble compound of aluminum with alkali metal compounds, in suspension in the presence of water and gaseous hydrofluoric acid, or its aqueous solution wherein is precipitated the water insoluble double fluoride, drying the gel and comminuting.

2. The process of making insecticidal preparations containing water-insoluble double fluorides of the alkali metals with aluminum which comprises treating a water insoluble compound of aluminum with the hydroxide of any alkali metal and hydrofluoric acid in the proper molecular proportions in the presence of water wherein is precipitated the water-insoluble double fluoride drying the gel and comminuting.

ROSCOE H. CARTER.